(12) United States Patent
Nagashima et al.

(10) Patent No.: US 11,441,634 B2
(45) Date of Patent: Sep. 13, 2022

(54) ANTI-VIBRATION DEVICE

(71) Applicant: Prospira Corporation, Kawasaki (JP)

(72) Inventors: Yasuyuki Nagashima, Tokyo (JP); Yuki Satake, Tokyo (JP); Akira Ueki, Tokyo (JP)

(73) Assignee: Prospira Corporation, Kawasaki (JP)

( * ) Notice: Subject to any disclaimer, the term of this patent is extended or adjusted under 35 U.S.C. 154(b) by 418 days.

(21) Appl. No.: 16/493,548

(22) PCT Filed: Jan. 15, 2018

(86) PCT No.: PCT/JP2018/000755
§ 371 (c)(1),
(2) Date: Sep. 12, 2019

(87) PCT Pub. No.: WO2018/198444
PCT Pub. Date: Nov. 1, 2018

(65) Prior Publication Data
US 2020/0011396 A1    Jan. 9, 2020

(30) Foreign Application Priority Data
Apr. 27, 2017 (JP) .............................. JP2017-088248

(51) Int. Cl.
*F16M 11/00* (2006.01)
*F16F 13/10* (2006.01)
*B60K 5/12* (2006.01)

(52) U.S. Cl.
CPC .......... *F16F 13/107* (2013.01); *B60K 5/1208* (2013.01); *F16F 13/10* (2013.01)

(58) Field of Classification Search
CPC ........ F24F 1/1405; F24F 11/30; F24F 1/0358; F24F 3/00; F24F 1/04; F24F 3/14; F24F 13/20; F14F 1/00; F25B 5/02; F25B 6/02
See application file for complete search history.

(56) References Cited

U.S. PATENT DOCUMENTS

| 4,787,610 A * | 11/1988 | Kojima .................. F16F 13/20 |
| | | 188/320 |
| 6,352,249 B2 * | 3/2002 | Muramatsu ........... F16F 13/268 |
| | | 267/140.14 |

(Continued)

FOREIGN PATENT DOCUMENTS

| EP | 3 070 366 A1 | 9/2016 |
| FR | 2714947 A1 | 7/1995 |

(Continued)

OTHER PUBLICATIONS

Communication dated Jul. 24, 2020 from European Patent Office in EP Application No. 18791958.4.

(Continued)

*Primary Examiner* — Amy J. Sterling
(74) *Attorney, Agent, or Firm* — Kenja IP Law PC (57) ABSTRACT

In the present invention, a restriction passage (24) includes a first communication portion (26) that is open to a first liquid chamber, a second communication portion (27) that is open to a second liquid chamber, and a main body flow path (25) that is configured to cause the first communication portion (26) and the second communication portion (27) to communicate with each other, and in a portion of the main body flow path (25) connected to at least one of the first communication portion (26) and the second communication portion (27), a guide portion (43) that is configured to guide a liquid from the other of the first communication portion (26) and the second communication portion (27) to an opposed surface (34a) that is opposed to one of the first communication portion (26) and the second communication portion (27) in an inner surface of the restriction passage (24) is disposed.

3 Claims, 4 Drawing Sheets (56) References Cited

U.S. PATENT DOCUMENTS

| | | | | |
|---|---|---|---|---|
| 8,430,373 B2* | 4/2013 | Nishi | ............... | F16F 13/108 |
| | | | | 267/140.13 |
| 2012/0248668 A1* | 10/2012 | Umemura | ............ | F16F 13/107 |
| | | | | 267/140.11 |
| 2016/0131219 A1 | 5/2016 | Ueki et al. | | |

FOREIGN PATENT DOCUMENTS

| | | | |
|---|---|---|---|
| JP | 2005-337348 A | 12/2005 | |
| JP | 2008-069905 A | 3/2008 | |
| JP | 2008-248967 A | 10/2008 | |
| JP | 2009-191999 A | 8/2009 | |
| JP | 2010-169160 A | 8/2010 | |
| JP | 2012-172832 A | 9/2012 | |
| KP | 2008303910 A | 12/2008 | |
| WO | 2014/196284 A1 | 12/2014 | |

OTHER PUBLICATIONS

International Search Report for PCT/JP2018/000755 dated Mar. 13, 2018 [PCT/ISA/210] English.

* cited by examiner

ANTI-VIBRATION DEVICE

TECHNICAL FIELD

The present invention relates to an anti-vibration device which is applied to, for example, a vehicle or an industrial machine, and absorbs and attenuates vibration of a vibration generating portion such as an engine.

This application is a National Stage of International Application No. PCT/JP2018/000755, filed on Jan. 15, 2018, which claims priority from Japanese Patent Application No. 2017-088248, filed on Apr. 27, 2017, the content of which is incorporated herein by reference.

BACKGROUND

As this type of anti-vibration device, in the related art, a configuration including a cylindrical first mounting member connected to one of a vibration generating portion and a vibration receiving portion, a second mounting member connected to the other, an elastic body that connects both the mounting members to each other, and a partition member that partitions a liquid chamber in the first mounting member having a liquid sealed therein into a main liquid chamber and an auxiliary liquid chamber is known. In the partition member, a restriction passage that causes the main liquid chamber and the auxiliary liquid chamber to communicate with each other is formed. In this anti-vibration device, when vibration is input, both the mounting members are relatively displaced while elastically deforming the elastic body, and the liquid pressure of the main liquid chamber is fluctuated to circulate the liquid in the restriction passage, whereby the vibration is absorbed and attenuated.

However, in this anti-vibration device, for example, when the liquid pressure of the main liquid chamber rises sharply due to an input of a large load from uneven portions of a road surface or the like and thereafter a load is input in the reverse direction due to rebounding of the elastic body or the like, a negative pressure is suddenly generated in the main liquid chamber. Then, this suddenly generated negative pressure may cause cavitation in which a large number of bubbles are generated in the liquid, and furthermore, abnormal noise may occur due to cavitation collapse in which the generated bubbles collapse.

Therefore, for example, as in an anti-vibration device described in Patent Document 1 below, a configuration in which a valve body is provided in a restriction passage to limit the generation of a negative pressure in a main liquid chamber even when vibration with a large amplitude is input is known.

CITATION LIST

Patent Literature

[Patent Document 1] Japanese Unexamined Patent Application, First Publication No. 2012-172832

SUMMARY OF INVENTION

Technical Problem

However, in the anti-vibration device in the related art, the structure becomes complex due to the provision of the valve body, and the valve body also needs to be tuned, so that there is a problem that the manufacturing cost increases. In addition, due to the provision of the valve body, the degree of freedom in design decreases, and as a result, there is a possibility of a reduction in anti-vibration characteristics.

The present invention has been made in view of the above-mentioned circumstances, and an object thereof is to provide an anti-vibration device capable of showing the generation of abnormal sound caused by cavitation collapse without reducing anti-vibration characteristics with a simple structure.

Solution to Problem

An anti-vibration device according to the present invention is a liquid-sealed type anti-vibration device including: a cylindrical first mounting member connected to either one of a vibration generating portion and a vibration receiving portion, and a second mounting member connected to the other; an elastic body elastically connecting both the mounting members to each other; and a partition member that partitions a liquid chamber in the first mounting member in which a liquid is sealed into a first chamber and a second liquid chamber, in which a restriction passage that is configured to cause the first liquid chamber and the second liquid chamber to communicate with each other is formed in the partition member, the restriction passage includes a first communication portion that is open to the first liquid chamber, a second communication portion that is open to the second liquid chamber, and a main body flow path that is configured to cause the first communication portion and the second communication portion to communicate with each other, and in a portion of the main body flow path connected to at least one of the first communication portion and the second communication portion, a guide portion that is configured to guide the liquid from the other of the first communication portion and the second communication portion to an opposed surface that is opposed to one of the first communication portion and the second communication portion in an inner surface of the restriction passage is disposed.

Advantageous Effects of Invention

According to the present invention, it is possible to limit the generation of abnormal sound caused by cavitation collapse without reducing anti-vibration characteristics with a simple structure.

DESCRIPTION OF EMBODIMENTS

Figure 1:
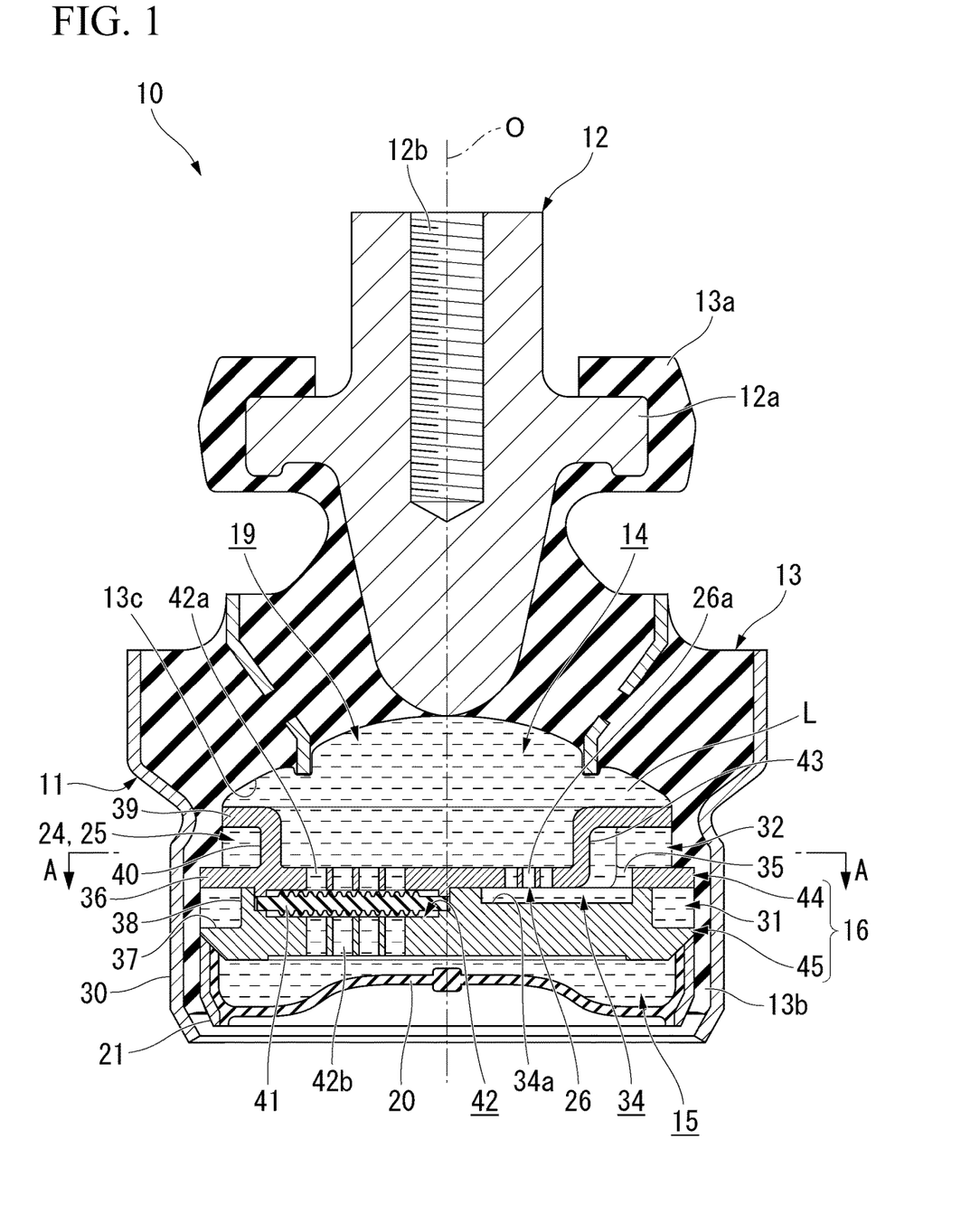
FIG. 1 is a longitudinal view of an anti-vibration device according to an embodiment of the present invention.

Hereinafter, an embodiment of an anti-vibration device according to the present invention will be described with reference to FIGS. 1 to 4. As shown in FIG. 1, an anti-vibration device 10 is a liquid-sealed type anti-vibration device including: a cylindrical first mounting member 11 connected to any one of a vibration generating portion and a vibration receiving portion, a second mounting member 12 connected to the other of the vibration generating portion and the vibration receiving portion, an elastic body 13 which elastically connects the first mounting member 11 and the second mounting member 12 to each other, and a partition member 16 which partitions a liquid chamber 19 in the first mounting member 11 into a main liquid chamber (first liquid chamber) 14 and an auxiliary liquid chamber (second liquid chamber) 15, which will be described later.

Hereinafter, a direction along a central axis O of the first mounting member 11 is referred to as an axial direction. The second mounting member 12 side along the axial direction is referred to as an upper side, and the partition member 16 side is referred to as a lower side. Furthermore, in a plan view of the anti-vibration device 10 as viewed in the axial direction, a direction orthogonal to the central axis O is referred to as a radial direction, and a direction circling around the central axis O is referred to as a circumferential direction.

The first mounting member 11, the second mounting member 12, and the elastic body 13 are each formed in a circular shape or an annular shape in a plan view, and are arranged coaxially with the central axis O.

In a case where the anti-vibration device 10 is mounted on, for example, a vehicle, the second mounting member 12 is connected to the engine as the vibration generating portion, and the first mounting member 11 is connected to the vehicle body as the vibration receiving portion. Accordingly, transmission of vibration of the engine to the vehicle body is limited.

The second mounting member 12 is a columnar member extending in the axial direction, has a hemispherical shape protruding downward at the lower end portion, and has a flange portion 12a above the hemispherical lower end portion. The second mounting member 12 is provided with a threaded hole 12b extending downward from the upper end surface thereof, and a bolt (not shown) serving as a mounting tool on the engine side is screwed into the threaded hole 12b. The second mounting member 12 is disposed at the upper end opening of the first mounting member 11 via the elastic body 13.

The elastic body 13 is a rubber body which is adhered by vulcanization to each of the upper end opening of the first mounting member 11 and the outer circumferential surface of the lower portion of the second mounting member 12 so as to be interposed therebetween, and closes the upper end opening of the first mounting member 11 from the upper side. At the upper end portion of the elastic body 13, a first rubber film 13a that integrally covers the lower surface, the outer circumferential surface, and the upper surface of the flange portion 12a is integrally formed. At the lower end portion of the elastic body 13, a second rubber film 13b which covers the inner circumferential surface of the first mounting member 11 in a liquid-tight manner is integrally formed. As the elastic body 13, an elastic body made of a synthetic resin or the like instead of rubber can also be used.

The first mounting member 11 is formed in a cylindrical shape, and is connected to the vehicle body or the like as the vibration receiving portion via a bracket (not shown). The lower end opening of the first mounting member 11 is closed by a diaphragm 20.

The diaphragm 20 is made of an elastic material such as rubber or a soft resin, and is formed in a cylindrical shape with a bottom. The outer circumferential surface of the diaphragm 20 is adhered by vulcanization to the inner circumferential surface of a diaphragm ring 21. The diaphragm ring 21 is fitted in the lower end portion of the first mounting member 11 via the second rubber film 13b. The diaphragm ring 21 is crimped and fixed in the lower end portion of the first mounting member 11. The upper end opening edges of the diaphragm 20 and the diaphragm ring 21 are in liquid-tight contact with the lower surface of the partition member 16.

As the diaphragm 20 is mounted to the first mounting member 11, the inside of the first mounting member 11 is the liquid chamber 19 liquid-tightly sealed by the elastic body 13 and the diaphragm 20. A liquid L is sealed (filled) in the liquid chamber 19.

In the example shown, the bottom portion of the diaphragm 20 is deep at the outer circumferential side and shallow at the central portion. However, as a shape of the diaphragm 20, various shapes conventionally known can be adopted other than such a shape.

The liquid chamber 19 is partitioned y the partition member 16 into the main liquid chamber 14 and the auxiliary liquid chamber 15. The main liquid chamber 14 is a space that has a lower surface 13c of the elastic body 13 at a portion of the wall surface and is surrounded by the elastic body 13, and the second rubber film 13b which liquid-tightly covers the inner circumferential surface of the first mounting member and the partition member 16, and the internal volume thereof changes with the deformation of the elastic body 13. The auxiliary liquid chamber 15 is a space surrounded by the diaphragm 20 and the partition member 16, and the internal volume thereof changes with the deformation of the diaphragm 20. The anti-vibration device 10 having such a configuration is a compression type device that is mounted and used so that the main liquid chamber 14 is located on the upper side in the vertical direction and the secondary liquid chamber 15 is located on the lower side in the vertical direction.

An accommodation chamber 42 in which a membrane 41 made of, for example, a rubber material is accommodated, is formed inside the partition member 16. The membrane 41 is formed in a plate shape of which the front and back faces face in the axial direction. In the partition member 16, a plurality of first communication holes 42a that cause the accommodation chamber 42 and the main liquid chamber 14 to communicate with each other, and a plurality of second communication holes 42b that cause the accommodation chamber 42 and the auxiliary liquid chamber 15 to communicate with each other. The number of first communication holes 42a and the number of second communication holes 42b are the same. The inner diameters of the first communication hole 42a and the second communication hole 42b are the same. The plurality of first communication holes 42a and the plurality of second communication holes 42b are opposed to each other in the axial direction with the membrane 41 and the accommodation chamber 42 interposed therebetween.

Figure 2:
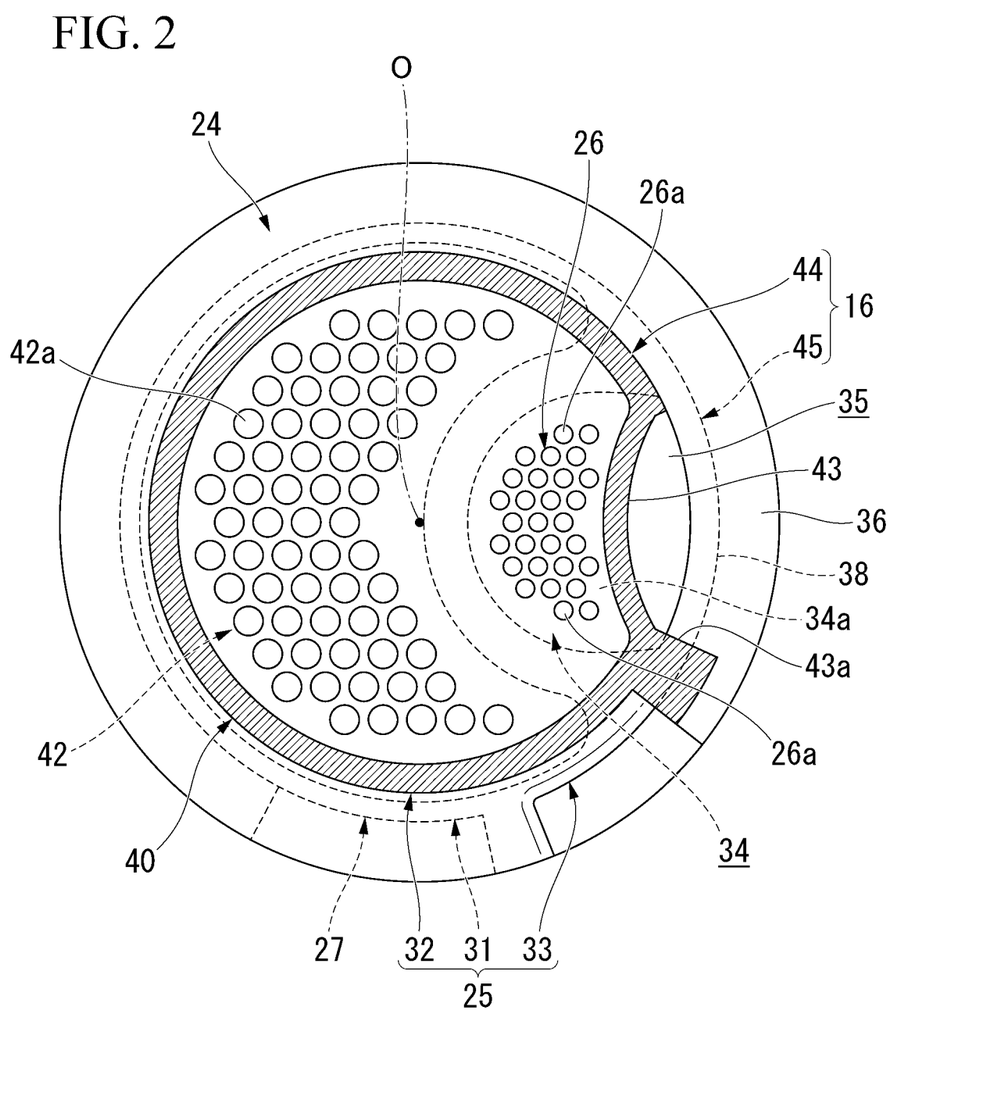
FIG. 2 is a cross-sectional view taken along line A-A of a partition member included in the anti-vibration device shown in FIG. 1.
Figure 3:
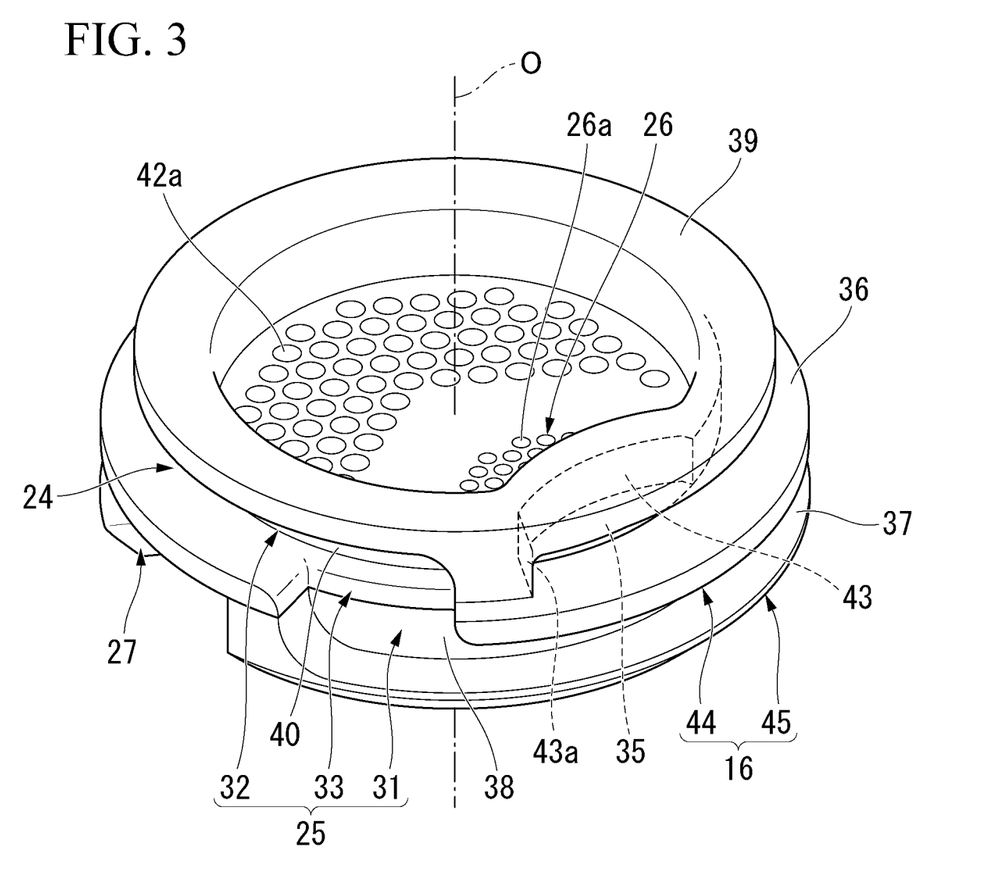
FIG. 3 is a perspective view of the partition member included in the anti-vibration device shown in FIG. 1.

The partition member 16 is provided with a restriction passage 24 that is configured to cause the main liquid chamber 14 and the auxiliary liquid chamber 15 to communicate with each other. As shown in FIGS. 2 and 3, the restriction passage 24 includes a first communication portion 26 that is open to the main liquid chamber 14, a second communication portion 27 that is open to the auxiliary liquid chamber 15, and a main body flow path 25 that causes the first communication portion 26 and the second communication portion 27 to communicate with each other.

The main body flow path 25 includes a lower flow path 31 that is connected to the second communication portion 27, is located at the lower portion of the partition member 16, and extends in the circumferential direction, an upper flow path 32 that is located at the upper portion of the partition member 16 and extends in the circumferential direction, and a connection path 33 that connects the lower flow path 31 and the upper flow path 32 to each other.

The second communication portion 27 opens to one end portion of the lower flow path 31 in the circumferential direction.

The connection path 33 connects the other end portion of the lower flow path 31 in the circumferential direction to one end portion of the upper flow path 32 in circumferential direction.

The lower flow path 31 and the upper flow path 32 are formed in the outer circumferential surface of the partition member 16. The lower flow path 31 and the upper flow path 32 are each disposed in the partition member 16 in an angle range of less than 360° centered on the central axis O. In the example shown, the lower flow path 31 and the upper flow path 32 are each disposed in the partition ember 16 in an angle range of more than 180° centered on the central axis O. The positions along the circumferential direction of the other end portion of the lower flow path 31 in the circumferential direction and one end portion of the upper flow path 32 in the circumferential direction are equal to each other.

The lower flow path 31 and the upper flow path 32 are disposed coaxially with the central axis O, and are axially partitioned by an annular first barrier 36 of which front and back faces face in the axial direction.

The connection path 33 penetrates the first barrier 36 in the axial direction.

The lower flow path 31 is defined by an annular second barrier 37 which is disposed coaxially with the central axis O and has front and back faces facing in the axial direction, the above-mentioned first barrier 36 located on the upper side, and a lower groove bottom surface 38 which connects the inner circumferential edges of the first and second barriers 36 and 37 to each other and faces a radially outer side. The second barrier 37 faces the auxiliary liquid chamber 15, and the second communication portion 27 is formed of an opening penetrating the second barrier 37 in the axial direction.

The upper flow path 32 is defined by the above-mentioned first barrier 36 located on the lower side, an annular third barrier 39 which is disposed coaxially with the central axis O, is located on the upper side, and has front and back faces facing in the axial direction, and an annular upper groove bottom wall 40 which connects the inner circumferential edges of the first and third barriers 36 and 39 to each other.

The third barrier 39 faces the main liquid chamber 14.

The other end portion of the upper flow path 32 in the circumferential direction protrudes radially inward of the other portions. The other end portion of the upper flow path 32 in the circumferential direction is located to protrude inward in the radial direction beyond the lower groove bottom surface 38 of the lower flow path 31 in a plan view as viewed in the axial direction. In the third barrier 39, the inner circumferential edge of a portion defining the other end portion of the upper flow path 32 in the circumferential direction has a curved shape protruding inward in the radial direction in a plan view as viewed in the axial direction.

Here, in the present embodiment, the restriction passage 24 includes a diffusion chamber 34 disposed between the upper flow path 32 of the main body flow path 25 and the first communication portion 26, and a communication opening 35 that causes the upper flow path 32 and the diffusion chamber 34 to communicate with each other.

The diffusion chamber 34 is formed inside the partition member 16 and protrudes radially inward from the other end portion of the upper flow path 32 in the circumferential direction in a plan view as viewed in the axial direction. The diffusion chamber 34 is disposed in a part located below the upper flow path 32 inside the partition member 16. The diffusion chamber 34 is disposed flush with the accommodation chamber 42 in a direction orthogonal to the axial direction, and does not communicate with the accommodation chamber 42 inside the partition member 16. The internal volume and the planar area of the diffusion chamber 34 are smaller than the internal volume and the planar area of the accommodation chamber 42. The shape of the diffusion chamber 34 in a plan view has a semicircular shape that protrudes inward in the radial direction. In the wall surfaces defining the diffusion chamber 34, the planar area of an opposed surface 34a opposed to the first communication portion 26 in the axial direction is larger than the cross-sectional areas of the lower flow path 31 and the upper flow path 32. The opposed surface 34a is orthogonal to the axial direction.

The communication opening 35 causes the outer end portion of the diffusion chamber 34 in the radial direction and the other end portion of the upper flow path 32 in the circumferential direction to communicate with each other in the axial direction. The communication opening 35 does not communicate with the lower flow path 31. The shape of the communication opening 35 in the plan view is an oval shape extending in the circumferential direction, and the size in the radial direction, that is, the width gradually increases from the outer side to the inner side in the circumferential direction. The outer end edges of the communication opening 35 and the diffusion chamber 34 in the radial direction are coincident with the inner circumferential edge of the first barrier 36.

In the partition walls defining the diffusion chamber 34, the first communicating portion 26 is formed in the upper wall (barrier) that is located on the upper side, has front and back faces facing in the axial direction, is opposed to the opposed surface 34a in the axial direction, and faces the main liquid chamber 14. The first communication portion 26 includes a plurality of pores 26a penetrating the upper wall in the axial direction. The lower surface of the upper wall is flat.

Each of the plurality of pores 26a is smaller than the cross-sectional area of each of the lower flow path 31 and the upper flow path 32, and is disposed inside the diffusion chamber 34 in a plan view as viewed in the axial direction. The inner diameter of the pore 26a is smaller than the inner diameter of each of the first communication hole 42a and the second communication hole 42b. The sum of the opening areas of the plurality of pores 26a is smaller than the sum of the opening areas of the plurality of first communication holes 42a and the sum of the opening areas of the plurality of second communication holes 42b. The sum of the opening areas of the plurality of pores 26a may be, for example, 1.5 times or more and 4.0 times or less the minimum value of the flow path cross-sectional area of each of the lower flow path 31 and the upper flow path 32. In the example shown, the cross-sectional areas of the lower flow path 31 and the upper flow path 32 are equal to each other over the entire length. The opening area of the pores 26a is, for example, 25 mm 2 or less, and preferably 0.7 mm 2 or more and 17 mm 2 or less.

In the present embodiment, a guide portion 43 that guides the liquid L front the second communication portion 27 side to the opposed surface 34a of the diffusion chamber 34 opposed to the first communication portion 26 in the inner surface of the restriction passage 24 is disposed at a portion of the main body flow path 25 connected to the first communication portion 26. In the example shown, the other end portion in the circumferential direction of the upper groove bottom wall 40 for defining the upper flow path 32 is the guide portion 43.

The guide portion 43 is formed in a curved surface shape protruding inward in the radial direction. The guide portion 43 is spaced radially inward from the inner circumferential edge of a portion of the first barrier 36 that defines the other end portion of the upper flow path 32 in the circumferential direction. A gap in the radial direction between the outer circumferential surface of the guide portion 43 facing e radially outer side and the inner circumferential edge of the portion of the first barrier 36 that defines the other end portion of the upper flow path 32 in the circumferential direction is the above-described communication opening 35.

The inner circumferential edge of the portion of the first barrier 36 that defines the other end portion of the upper flow path 32 in the circumferential direction may be formed in a curved shape protruding inward in the radial direction in a plan view as viewed in the axial direction as in the third barrier 39, and the communication opening 35 may be formed partially in a portion of the first barrier 36 located radially inward of the lower groove bottom surface 38.

Here, in the end surfaces defining the upper flow path 32, an end surface 43a on the other side in the circumferential direction, which is located at the other end edge in the circumferential direction and faces one side in the circumferential direction is connected to the other end portion of the guide portion 43 in the circumferential direction.

In the above configuration, the liquid L that has flowed in the main body flow path 25 from the second communication portion 27 side to the first communication portion 26 side and reaches the other end side of the upper flow path 32 in the circumferential direction collides with the end surface 43a while flowing along the guide portion 43 such that the liquid L passes downward through the communication opening 35 and flows into the diffusion chamber 34. Accordingly, the liquid L is diffused in the diffusion chamber 34 by being guided toward and colliding with the opposed surface 34a of the diffusion chamber 34 before passing through the first communication portion 26 toward the main liquid chamber 14 side.

Here, the partition member 16 is configured such that an upper member 44 and a lower member 45 overlap in the axial direction. The upper member 44 is formed in a flat cylindrical shape with a bottom, and the lower member 45 is formed in a plate shape. The entirety of the partition member 16 may be integrally formed. In the upper member 44, the upper flow path 32 is formed in the outer circumferential surface of the circumferential wall, and in the bottom wall, the first communication hole 42a and the first communication portion 26 which open toward the inside of the circumferential wall and the communication opening 35 and the connection path 33 which do not communicate with the inside of the circumferential wall and open to the inside of the upper flow path 32 are formed. In the lower surface of the bottom wall of the upper member 44, a support protrusion is formed that abuts the outer circumferential edge portion of the upper surface of the membrane 41 over the entire circumference. The upper wall in which the first communication portion 26 is formed is a portion of the bottom wall of the upper member 44.

Figure 4:
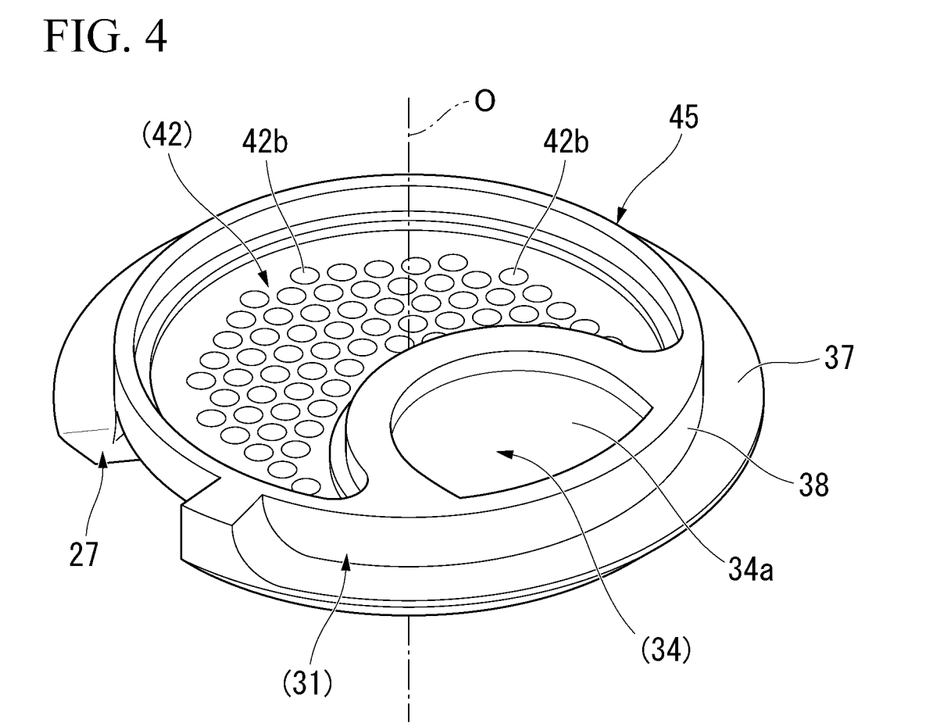
FIG. 4 is a perspective view of a lower member included in the partition member shown in FIG. 3.

The outer circumferential surface of the lower member 45 is the lower groove bottom surface 38. As shown in FIG. 4, on the upper surface of the lower member 45, a first recessed portion defining the accommodation chamber 42 with the lower surface of the bottom wall of the upper member 44, and a second recessed portion defining the diffusion chamber 34 with the lower surface of the bottom wall of the upper member 44 are formed.

On the outer circumferential surface of the lower end portion of the lower member 45, the annular second barrier 37 which protrudes outward in the radial direction and axially opposes the first barrier 36 is formed.

In the anti-vibration device 10 having such a configuration, when vibration is input, both the mounting members 11 and 12 are relatively displaced while elastically deforming the elastic body 13. Then, the liquid pressure in the main liquid chamber 14 fluctuates, the liquid L in the main liquid chamber 14 flows into the auxiliary liquid chamber 15 through the restriction passage 24, and the liquid L in the auxiliary liquid chamber 15 flows into the main liquid chamber 14 through the restriction passage 24.

In addition, according to the anti-vibration device 10 according to the present embodiment, the liquid L flowing from the second communication portion 27 side toward the first communication portion 26 in the main body flow path 25 is guided to and collides with the opposed surface 34a of the diffusion chamber 34 by the guide portion 43. At this time, an energy loss due to the collision between the liquid L and the opposed surface 34a, an energy loss due to the friction between the liquid L and the opposed surface 34a, and the like are incurred, so that the pressure loss of the liquid L flowing through the restriction passage 24 can be increased. Furthermore, at this time, the liquid L collides with the opposed surface 34a, so that the liquid L can be easily spread over the entire area of the first communication portion 26. In particular, after colliding with the opposed surface 34a by the guide portion 43, the liquid L flows toward the first communication portion 26 opposed to the opposed surface 34a, that is, flows backward, so that a large energy loss can be incurred. As described above, even if a large load (vibration) is input to the anti-vibration device 10, the flow velocity of the liquid L passing through the first communication portion 26 can be reduced. Accordingly, the difference in flow velocity generated between the liquid L which has passed through the first communication portion 26 and flowed into the first liquid chamber 14 and the liquid L in the first liquid chamber 14 is limited, so that the generation of a vortex caused by the difference in flow velocity and the generation of bubbles caused by the vortex can be limited. Furthermore, even if bubbles are generated in the main body flow path 25 instead of the first liquid chamber 14, the bubbles are caused to collide with the opposed surface 34a by the guide portion 43, so that the bubbles can be caused to pass through the first communication portion 26 after being finely dispersed.

As described above, the generation of bubbles themselves can be limited, and even if bubbles are generated, the bubbles can be easily maintained in a finely dispersed state. Therefore, even if cavitation collapse in which bubbles collapse occurs, abnormal sound generated can be limited.

Furthermore, when the liquid L flows into the first liquid chamber 14 through the plurality of pores 26a provided in the first communication portion 26, the liquid L flows through each of the pores 26a while being subjected to pressure loss by the upper wall in which the pores 26a are formed, so that the flow velocity of the liquid L flowing into the first liquid chamber 14 can be limited. Moreover, since the liquid L flows through the plurality of pores 26a instead of a single pore 26a, the liquid L can be branched into a plural of flows and can be circulated, so that the flow velocity of the liquid L which has passed through the individual pores 26a can be reduced. Furthermore, even if bubbles are generated in the main body flow path 25, since the plurality of pores 26a are disposed, the generated bubbles can be separated from each other in the first liquid chamber 14, so that joining and growing of the bubbles are limited and the bubbles can be easily maintained in a finely dispersed state.

In addition, since the liquid L flowing in the main body flow path 25 collides with the opposed surface 34a and is diffused in the diffusion chamber 34 before reaching the first communication portion 26, the pressure loss of the liquid L can be reliably increased, and the liquid L can be spread over the entire area of the first communication portion 26. Accordingly, the flow velocity of the liquid L passing through the first communication portion 26 can be reliably reduced.

In addition, since the main body flow path 25 extends in the circumferential direction and the opposed surface 34a as orthogonal to the axial direction, the flow path length of the restriction passage 24 and the planar area of the opposed surface 34a can be easily secured while showing bulkiness of the partition member 16 in the axial direction.

The technical scope of the present invention is not limited to the embodiment, and various modifications can be made without departing from the scope of the present invention.

In the embodiment, the guide portion 43 is disposed at the portion of the main body flow path 25 connected to the first communication portion 26. However, the guide portion 43 may be disposed at a portion of the main body flow path 25 connected to the second communication portion 27. The guide portion 43 may extend in a straight line in a plan view as viewed in the axial direction, or may be formed in a curved surface shape protruding outward in the radial direction.

Furthermore, the diffusion chamber 34 may not be disposed in the partition member 16, and may be disposed between the main body flow path 25 and the second communication portion 27. The shape of the diffusion chamber 34 in the plan view not limited to the semicircular shape, and may be appropriately changed to, for example, a rectangular shape. The planar area of the opposed surface 34a of the diffusion chamber 34 may be equal to or less than the size of the flow path cross-sectional area of the main body flow path 25. The aspect of the diffusion chamber 34 may be changed as appropriate, for example, the opposed surface 34a of the diffusion chamber 34 may be inclined with respect to the axial direction.

Moreover, although the configuration provided with the plurality of pores 26a as the first communication portion 26 has been described, a configuration provided with only a single opening may also be adopted.

In addition, a configuration provided with the plurality of pores 26a as the second communication portion 27 may be adopted.

In addition, although the configuration in which the upper flow path 32 and the lower flow path 31 are provided as the main body flow path 25 and the partition member 16 is circled about twice has been described, a configuration in which the partition member 16 is circled once or three or more times may be adopted.

Furthermore, the main body flow path 25 may be appropriately changed, for example, the main body flow path 25 may extend in the axial direction.

In addition, in the embodiment, the compression type anti-vibration device 10 in which a positive pressure acts on the main liquid chamber 14 due to the application of a support load has been described, but the embodiment is also applicable to a suspension type anti-vibration device in which the main liquid chamber 14 is located on the lower side in the vertical direction, the auxiliary liquid chamber 15 is mounted so as to be located on the upper side in the vertical direction, and a negative pressure is applied to the main liquid chamber 14 as a support load is applied.

In the embodiment, the partition member 16 partitions the liquid chamber 19 in the first mounting member 11 into the main liquid chamber 14 having the elastic body 13 in a portion of the wall surface and the auxiliary liquid chamber 15, but is not limited thereto. For example, instead of providing the diaphragm 20, a pair of elastic bodies 13 may be provided in the axial direction, and instead of providing the auxiliary liquid chamber 15, a pressure receiving liquid chamber having the elastic body 13 in a portion of the wall surface may be provided. For example, a change to another configuration in which the partition member 16 partitions the liquid chamber 19 in the first mounting member 11 in which the liquid L is sealed into the first liquid chamber 14 and the second liquid chamber 15 and at least one liquid chamber of the first liquid chamber 14 and the second liquid chamber 15 has elastic body 13 in a portion of the wall surface is possible as appropriate.

Furthermore, the anti-vibration device 10 according to the present invention is not limited to the engine mount of a vehicle, and may be applied to one other than the engine mount. For example, application to a mount of a generator mounted in a construction machine is possible, or application to a mount of a machine installed in a factory or the like is possible.

Furthermore, substitutions of the constituent elements of the embodiment with known constituent elements without departing from the spirit of the t2 are possible as appropriate, and the modification examples described above may be combined as appropriate.

According to the present invention, when vibration is input, both the mounting members are relatively displaced while elastically deforming the elastic body, the liquid pressure in the first liquid chamber and the second liquid chamber fluctuates, and the liquid tries to circulate between the first liquid chamber and the second liquid chamber through the restriction passage. At this time, the liquid flows into the restriction passage through one of the first communication portion and the second communication portion, passes through the main body flow path, and then flows out from the restriction passage through the other of the first communication portion and the second communication portion. Here, the liquid flowing in the main body flow path toward one of the first communication portion and the second communication portion from the other is guided to and collides with the opposed surface by the guide portion. At this time, an energy loss due to the collision between the liquid and the opposed surface, an energy loss due to the friction between the liquid and the opposed surface, and the like are incurred, so that the pressure loss of the liquid flowing through the restriction passage can be increased. Furthermore, at this time, the liquid collides with the opposed surface, so that the liquid can be easily spread over the entire area of one of the first communication portion and the second communication portion. In particular, after colliding with the opposed surface by the guide portion, the liquid flows toward one of the first communication portion and the second communication portion, which is opposed to the opposed surface, that is, flows backward, so that a large energy loss can be incurred. As described above, even if a large load (vibration) is input to the anti-vibration device, the flow velocity of the liquid passing through one of the first communication portion and the second communication portion can be reduced. Accordingly, the difference in flow velocity generated between the liquid which has passed through one of the first communication portion and the second communication portion and flowed into the first liquid chamber or the second liquid chamber and the liquid in the first liquid chamber or the second liquid chamber is limited, so that the generation of bubbles can be limited. In addition, even if bubbles are generated in the main body flow path instead of the first liquid chamber or the second liquid chamber, the bubbles are caused to collide with the opposed surface by the guide portion, so that the bubbles can be caused to pass through one of the first communication portion and the second communication portion after being finely dispersed.

As described above, the generation of bubbles themselves can be limited, and even if bubbles are generated, the bubbles can be easily maintained in a finely dispersed state. Therefore, even if cavitation collapse in which bubbles collapse occurs, abnormal sound generated can be limited.

Here, at least one of the first communication portion and the second communication portion may be provided with a plurality of pores penetrating a barrier facing the first liquid chamber or the second liquid chamber.

In this case, when the liquid flows into the first liquid chamber or be second liquid chamber through the plurality of pores provided in one of the first communication portion and the second communication portion, the liquid flows through each of the pores while being subjected to pressure loss by the wall in which the pores are formed, so that the flow velocity of the liquid flowing into the first liquid chamber or the second liquid chamber can be limited. Moreover, since the liquid flows through the plurality of pores instead of a single pore, the liquid can be branched into a plural of flows and can be circulated, so that the flow velocity of the liquid which has passed through the individual pores can be reduced. Furthermore, even if bubbles are generated in the main body flow path, since the plurality of pores are disposed, the generated bubbles can be separated from each other in the first liquid chamber or in the second liquid chamber, so that joining and growing of the bubbles are limited and the bubbles can be easily maintained in a finely dispersed state.

In addition, between the main body flow path and at least one of the first communication portion and the second communication portion, the diffusion chamber that has the opposed surface in a portion of the wall surface and causes the liquid that has passed through the guide portion from the other of the first communication portion and the second communication portion to be diffused nay be disposed, and the planar area of the opposed surface may be larger than the flow path cross-sectional area of the main body flow path.

In this case, since the liquid flowing in the main body flow path collides with opposed surface and is diffused in the diffusion chamber before reaching one of the first communication portion and the second communication portion, the pressure loss of the liquid can be reliably increased, and the liquid can be spread over the entire area of one of the first communication portion and the second communication portion. Accordingly the flow velocity of the liquid passing through one of the first communication portion and the second communication portion can be reliably reduced.

Furthermore, the main body flow path may extend in the circumferential direction around the central axis of the first mounting member, and the opposed surface may be orthogonal to the axial direction in which the central axis extends.

In this case, since the main body flow path extends the circumferential direction and the opposed surface is orthogonal to the axial direction, the flow path length of the restriction passage and the planar area of the opposed surface can be easily secured while showing bulkiness of the partition member in the axial direction.

INDUSTRIAL APPLICABILITY

It is possible to limit the generation of abnormal sound caused by cavitation collapse without reducing anti-vibration characteristics with a simple structure.

REFERENCE SIGNS LIST

10 anti-vibration device
11 first mounting member
12 second mounting member
13 elastic body
14 main liquid chamber (first liquid chamber)
15 auxiliary liquid chamber (second liquid chamber)
16 partition member
19 liquid chamber
24 restriction passage
25 main body flow path
26 first communication portion
26a pore
27 second communication portion
34 diffusion chamber
34a opposed surface
43 guide portion
L liquid
O central axis

What is claimed is:

1. A liquid-sealed type anti-vibration device comprising:
a cylindrical first mounting member connected to either one of a vibration generating portion and a vibration receiving portion, and a second mounting member connected to the other;
an elastic body elastically connecting both the mounting members to each other; and
a partition member that partitions a liquid chamber in the first mounting member in which a liquid is sealed into a first liquid chamber and a second liquid chamber,
wherein a restriction passage that is configured to cause the first liquid chamber and the second liquid chamber to communicate with each other is formed in the partition member,
the restriction passage includes a first communication portion that is open to the first liquid chamber, a second communication portion that is open to the second liquid chamber, and a main body flow path that is configured to cause the first communication portion and the second communication portion to communicate with each other,
the main body flow path extends in a circumferential direction around a central axis of the first mounting member,
in a portion of the main body flow path connected to at least one of the first communication portion and the second communication portion, a guide portion that is configured to guide the liquid from the other of the first communication portion and the second communication portion to an opposed surface that is opposed to one of the first communication portion and the second communication portion in an inner surface of the restriction passage is disposed,
between the main body flow path and at least one of the first communication portion and the second communication portion, a diffusion chamber that has the opposed surface in a portion of a wall surface of the diffusion chamber and is configured to cause the liquid that has passed through the guide portion from the other of the first communication portion and the second communication portion to be diffused is disposed, and a planar area of the opposed surface is larger than a flow path cross-sectional area of the main body flow path.

2. The anti-vibration device according to claim 1, wherein at least one of the first communication portion and the second communication portion includes a plurality of pores penetrating a barrier facing the first liquid chamber or the second liquid chamber.

3. The anti-vibration device according to claim 1, wherein the opposed surface is orthogonal to an axial direction in which the central axis extends.

* * * * *